(12) United States Patent
Chang et al.

(10) Patent No.: US 7,877,851 B2
(45) Date of Patent: Feb. 1, 2011

(54) APPARATUS FOR MAKING TUBULAR FILM TRANSISTORS

(75) Inventors: Hwei-Liang Chang, Taoyuan County (TW); Hen-Rong Chang, Pingzhen (TW); Kuo-Lon Shieh, Taoyuan County (TW); Pi-Hsin Cheng, Zhongli (TW)

(73) Assignee: Atomic Energy Council-Institute of Nuclear Energy Research, Taoyuan County (TW)

( * ) Notice: Subject to any disclaimer, the term of this patent is extended or adjusted under 35 U.S.C. 154(b) by 183 days.

(21) Appl. No.: 12/068,120

(22) Filed: Feb. 1, 2008

(65) Prior Publication Data

US 2010/0108177 A1    May 6, 2010

(51) Int. Cl.
*H01M 8/10* (2006.01)
*H01M 8/00* (2006.01)

(52) U.S. Cl. ............ 29/592.1; 429/483; 429/492; 429/497

(58) Field of Classification Search ............ None
See application file for complete search history.

(56) References Cited

U.S. PATENT DOCUMENTS 7,378,172 B2 *   5/2008   Chang et al. ............ 429/492

FOREIGN PATENT DOCUMENTS

WO          03/103079      * 12/2003

* cited by examiner

*Primary Examiner*—John S Maples
(74) *Attorney, Agent, or Firm*—Jackson IPG PLLC; Demian K. Jackson

(57) ABSTRACT

Disclosed is an apparatus for making tubular-shaped membrane electrode assembly. The apparatus includes a guiding unit for guiding the direction of MEA production, a first weaving unit for weaving conductive fiber bundles into a first tubular conductive fabric around the guiding unit, a first catalyst-providing unit for forming a first catalyst film on the first tubular conductive fabric, a proton-exchange-membrane-providing unit for providing a proton-exchange-membrane on the first catalyst film, a second catalyst-providing unit for forming a second catalyst film on the proton-exchange-membrane, a second weaving unit for weaving conductive fiber bundles into a second tubular conductive fabric on the second catalyst film and a cooling and pulling unit for cooling and pulling the first tubular conductive fabric, the first catalyst film, the proton-exchange-membrane, the second catalyst film and the second tubular conductive fabric into a tubular laminate.

9 Claims, 5 Drawing Sheets

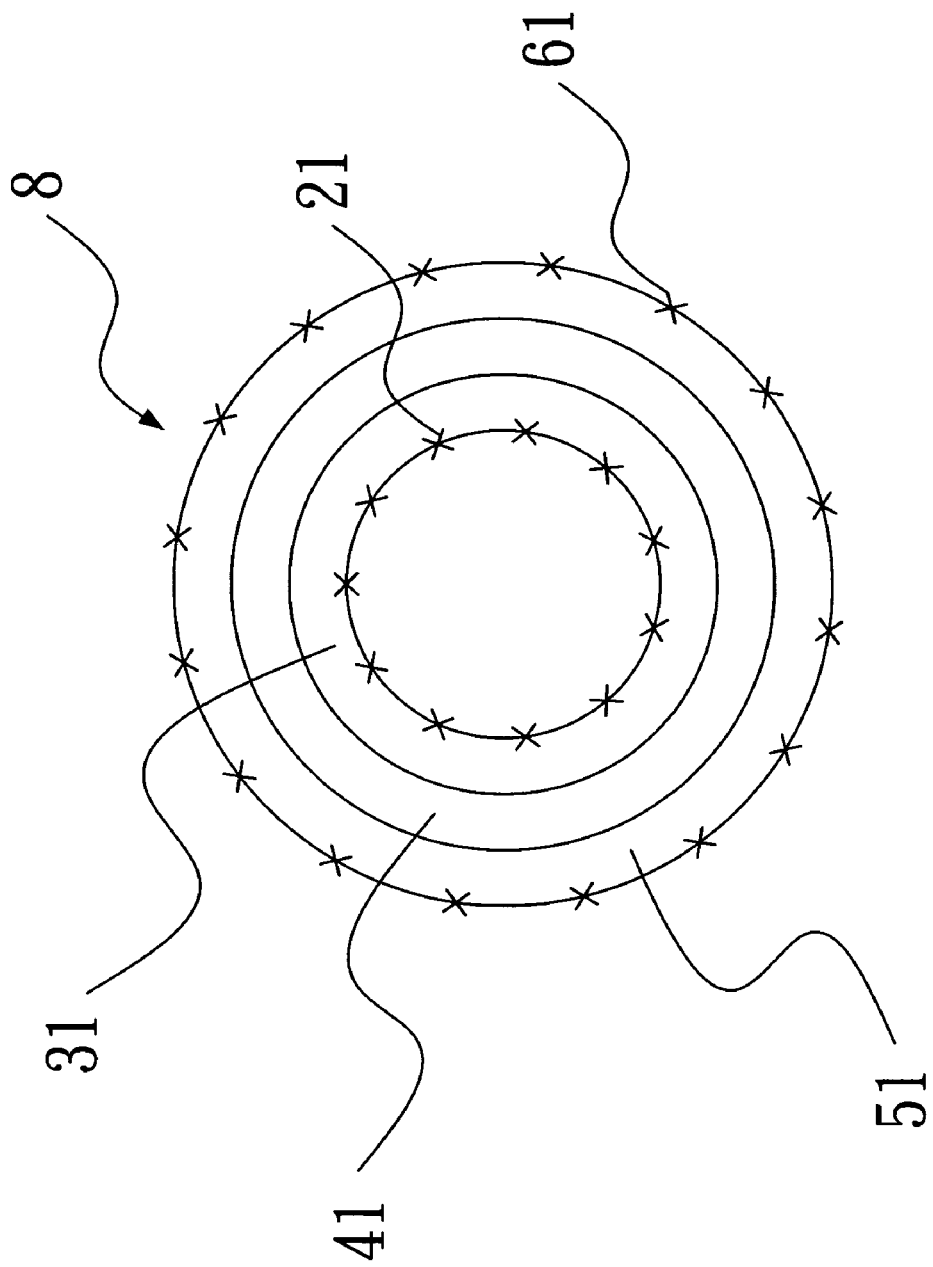

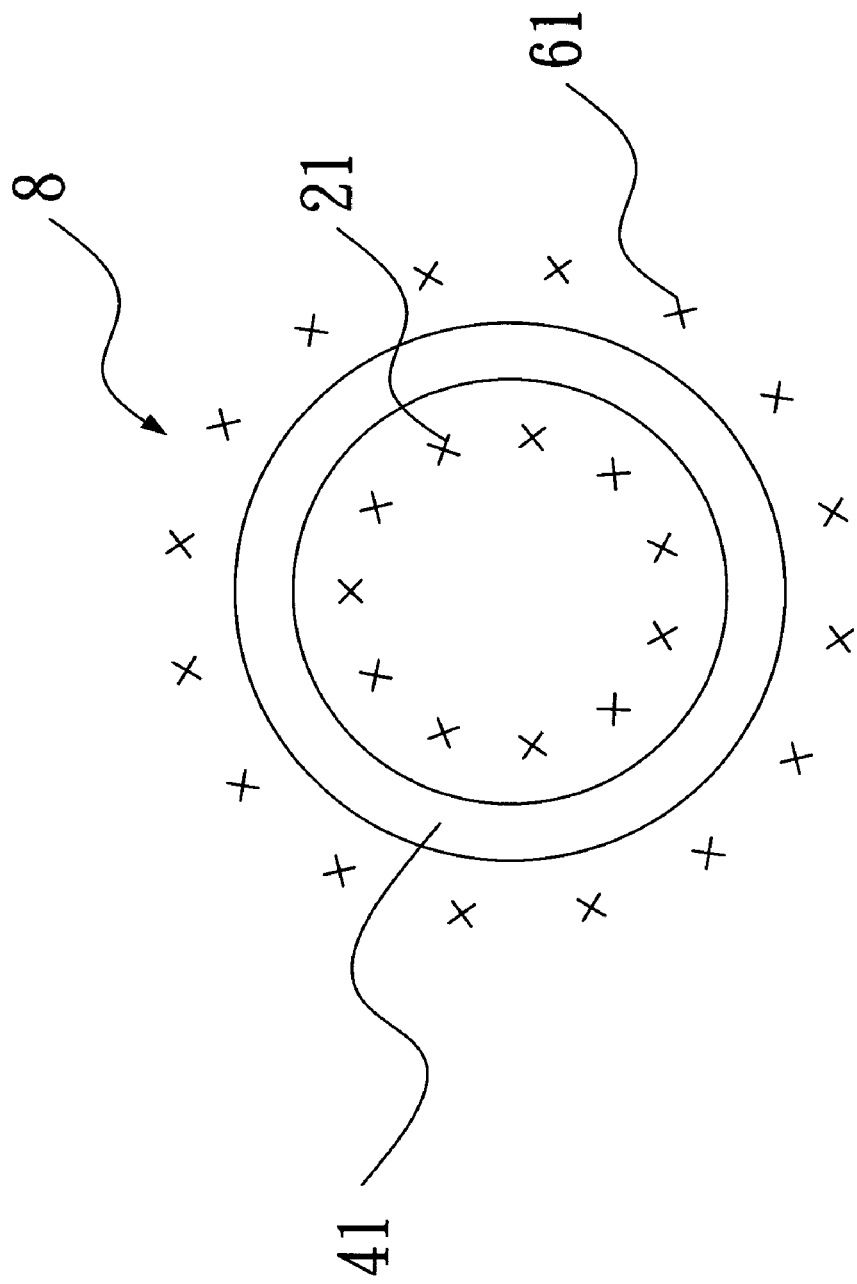

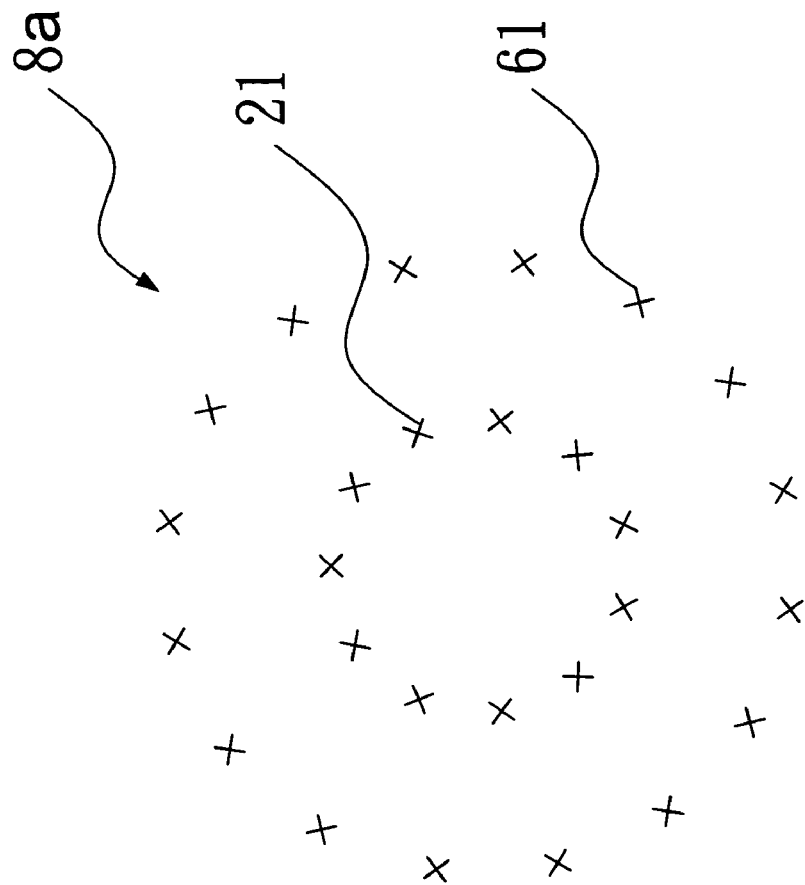

APPARATUS FOR MAKING TUBULAR FILM TRANSISTORS

FIELD OF THE INVENTION

The present invention relates to an apparatus for making tubular-shaped membrane electrode assembly (MEA) and, more particularly, to an apparatus for the mass production of tubular-shaped membrane electrode assembly.

DESCRIPTION OF THE RELATED ARTS

As disclosed in Taiwanese Patent M274656, a tubular-shaped membrane electrode assembly includes a tubular-shaped proton-exchange membrane, a pair of catalyst layers and a pair of electron conductive clothes with leading wire. To make the tubular-shaped membrane electrode assembly, a precursor of tubular-shaped proton exchange membrane precursor is made of polymer in a melting and injection process. The tubular-shaped precursor is converted into the tubular-shaped proton-exchange membrane in an ion exchange process. Electrode catalyst paste is made via mixing electrode catalyst with material for making the proton exchange membrane. The electrode catalyst paste is coated on the tubular-shaped conductive cloth. The tubular-shaped proton-exchange membrane is inserted in between the pair of tubular-shaped conductive cloth with catalyst paste coated. This aligned entity of the tubular-shaped proton-exchange membrane, and the two tubular-shaped conductive cloth with catalyst paste coated are set in a mold, subjected to a heating and pressing process and removed from the mold. Thus, the tubular-shaped membrane electrode assembly is made.

With the manufacturing method mentioned above, only batch type manufacturing process is available. It means loss of efficiency and cost of much. The present invention is intended to alleviate or abbreviate the above-mentioned problems and make the tubular-shaped membrane electrode assembly be mass-produced continuously.

SUMMARY OF THE INVENTION

The primary objective of the present invention is to provide an apparatus for the mass production of tubular-shaped membrane electrode assembly in a continuous manufacturing method.

To fulfill the primary objective of the present invention, the apparatus includes a guiding unit (such as guiding rod, guiding tube or guiding wire) to guide the direction of MEA production, a first weaving unit for weaving conductive fiber bundles into a first tubular conductive fabric around the guiding rod, a first catalyst-providing unit for forming a first catalyst film on the first tubular conductive fabric, a proton-exchange-membrane-providing unit for providing a proton-exchange-membrane on the first catalyst film, a second catalyst-providing unit for forming a second catalyst film on the proton-exchange membrane, a second weaving unit for weaving conductive fiber bundles into a second tubular conductive fabric on the second catalyst film and a cooling and pulling unit for cooling and pulling the first tubular conductive fabric, the first catalyst film, the proton-exchange-membrane, the second catalyst film and the second tubular conductive fabric into a tubular laminate. The tubular laminate can be cut into tubular-shaped membrane electrode assemblies of appropriate lengths.

Other objectives, advantages and features of the present invention will become apparent from the following description referring to the attached drawings.

BRIEF DESCRIPTION OF THE DRAWINGS

The present invention will be described via the detailed illustration of the preferred embodiment referring to the drawings.

FIG. 3 is a cross-sectional view of a tubular-shaped membrane electrode assembly made by the apparatus shown in FIG. 2.

FIG. 4 is a cross-sectional view of a tubular assembly without catalyst layers made by the apparatus shown in FIG. 2.

FIG. 5 is a cross-sectional view of a pair of leading wires made by the apparatus shown in FIG. 2.

DETAILED DESCRIPTION OF EMBODIMENT

Figure 1:
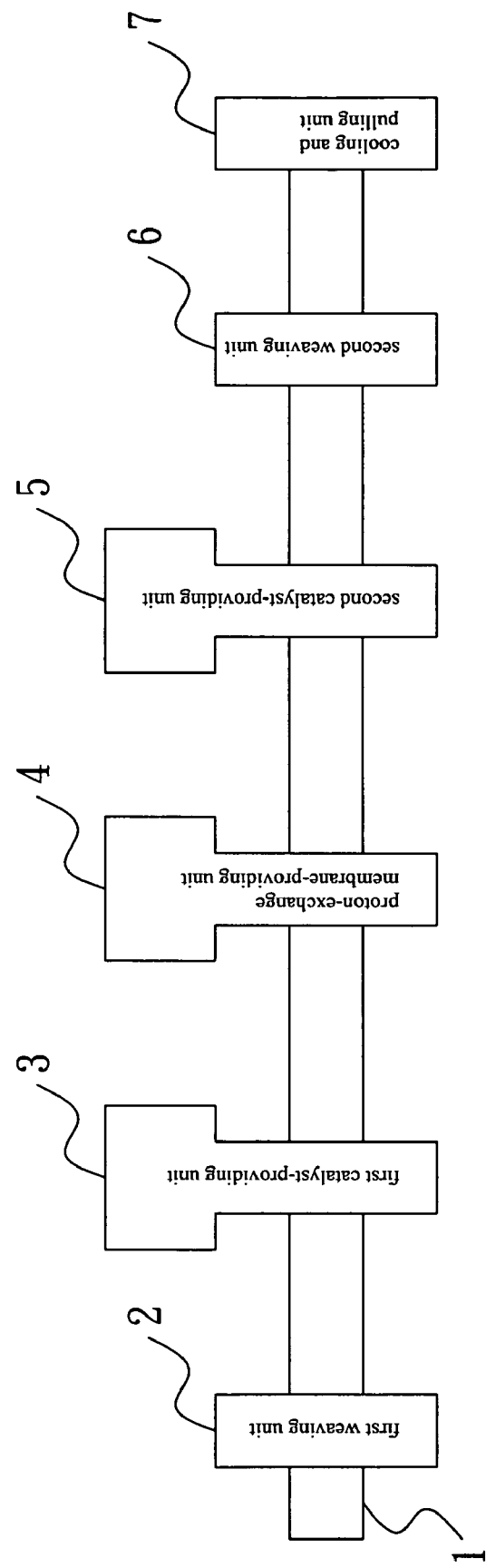
FIG. 1 is a block diagram of an apparatus for making tubular-shaped membrane electrode assembly according to the preferred embodiment of the present invention.

According to FIG. 1, an apparatus is devised to make tubular-shaped membrane electrode assembly according to the preferred embodiment of the present invention. The apparatus includes a guiding unit 1 (such as guiding rod, guiding tube or guiding wire) to guide the direction of MEA production, a first weaving unit 2 for weaving conductive fiber bundles into a first tubular conductive fabric around the guiding unit (or guiding rod, or guiding tube or guiding wire), a first catalyst-providing unit 3 for forming a first catalyst film on the first tubular conductive fabric, a proton-exchange-membrane-providing unit 4 for providing a proton-exchange-membrane on the first catalyst film, a second catalyst-providing unit 5 for forming a second catalyst film on the proton-exchange membrane, a second weaving unit 6 for weaving conductive fiber bundles into a second tubular conductive fabric on the second catalyst film, and a cooling and pulling unit 7 for cooling and pulling the first tubular conductive fabric, the first catalyst film, the proton-exchange-membrane, the second catalyst film and the second tubular conductive fabric into a tubular laminate that can be cut into tubular-shaped membrane electrode assembly of appropriate lengths. The guiding unit 1 is inserted through the first weaving unit 2, the first catalyst-providing unit 3, the proton-exchange-membrane-providing unit 4, the second catalyst-providing unit 5, the second weaving unit 6 and (or not necessary through) the cooling and pulling unit 7 arranged in order.

Figure 2:
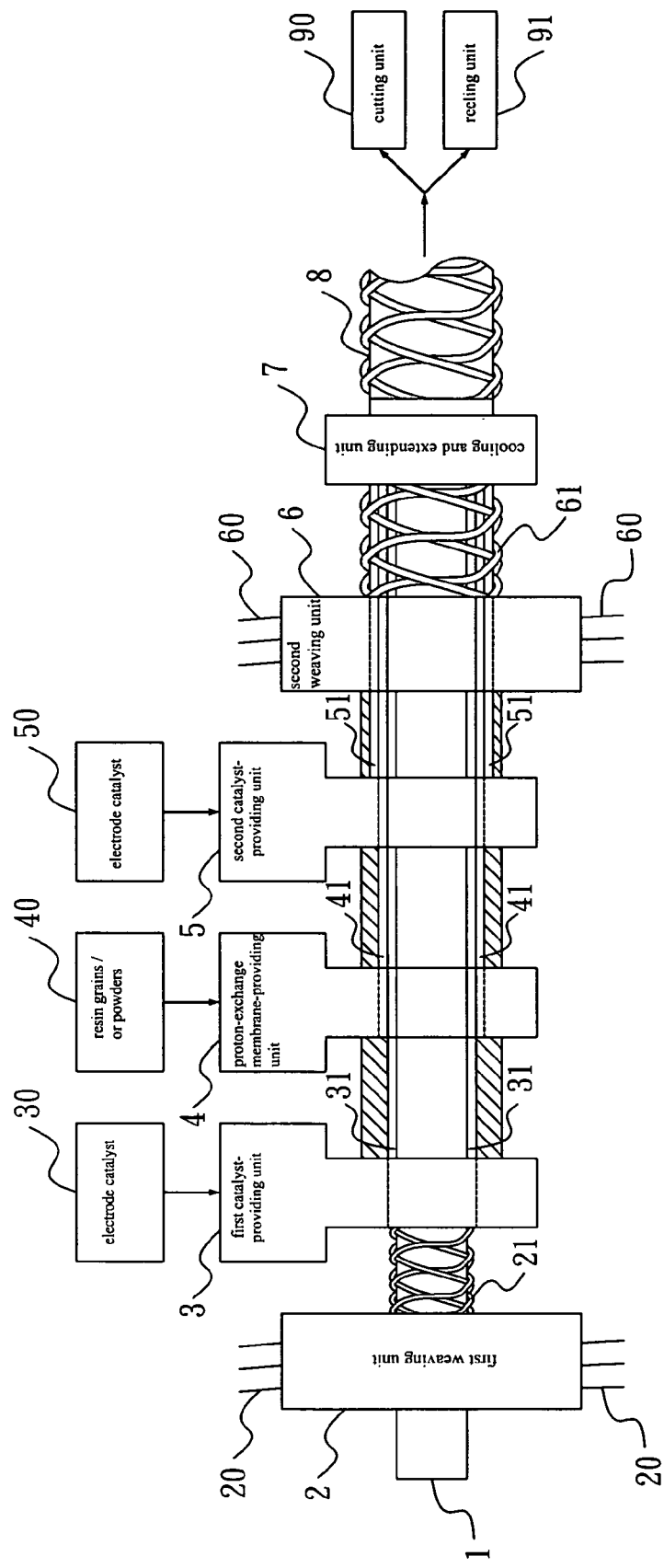
FIG. 2 is a more detailed typical drawing for the apparatus shown in FIG. 1.

Referring to FIGS. 2 and 3, in the first weaving unit 2, conductive fiber bundles 20 are provided. The conductive fiber bundles 20 may be made of carbon. The conductive fiber bundles 20 are woven into a first tubular conductive fabric 21 around the guiding rod 1. Then, the first tubular conductive fabric 21 is moved into the first catalyst-providing unit 30 along the guiding rod 1.

In the first catalyst-providing unit 3, electrode catalyst 30 suitable for fuel cells is provided, in liquid (or slurry, or paste), onto the tubular conductive fabric 21. After setting, the electrode catalyst 30 becomes a first catalyst film 31 around the tubular conductive fabric 21. Then, they are moved into the proton-exchange membrane-providing unit 4 along the guiding unit 1.

In the proton-exchange membrane-providing unit 4, resin grains or powders 40 are molten and provided onto the first catalyst film 31. The resin may be proton-exchanging resin or precursor. After setting, the resin forms a proton-exchange membrane 41 around the first catalyst film 31. Then, they are moved into the second catalyst-providing unit 5.

In the second catalyst-providing unit 5, electrode catalyst 50 suitable for fuel cells is provided, in liquid (or slurry, or paste), onto the proton-exchange-membrane 41. After setting, the electrode catalyst 50 becomes a second catalyst film 51 around the proton-exchange membrane 41. Then, they are moved into the second weaving unit 6 along the guiding rod 1.

In the second weaving unit 6, conductive fiber bundles 60 are provided. The conductive fiber bundles 60 may be made of carbon. The conductive fiber bundles 60 are woven into a second tubular conductive fabric 61 around the second catalyst film 51. Then, they are moved into the cooling and pulling unit 7 along the guiding rod 1 or the extending direction of the guiding rod 1.

In the cooling and pulling unit 7, the first conductive fabric 21, the first catalyst film 31, the proton-exchange-membrane 41, the second catalyst film 51 and the second tubular conductive fabric 61 are cooled and pulled, thus forming a tubular laminate 8. The thickness of proton-exchange membrane is in the range of one tenth to ten times as the inside diameter of the tubular-shaped membrane electrode assembly 8. The thickness of the first and second catalyst films 31 and 51 is one tenth of a micrometer to several millimeters.

The tubular laminate 8 may be sent to a cutting unit 90 where the tubular laminate 8 is cut into tubular-shaped membrane electrode assemblies of appropriate lengths.

Alternatively, the tubular laminate 8 may be sent to a reeling unit 91 where the tubular laminate 8 is reeled. The tubular laminate 8 can later be cut into tubular-shaped membrane electrode assemblies of appropriate lengths.

The apparatus shown in FIG. 2 can be used to make leads shown in FIG. 4. In this case, the first and second catalyst-providing units 3 and 5 are stopped. That is, only the first weaving unit 2, the proton-exchange-membrane-providing unit 4 and the second weaving unit 6 are activated to make a tubular assembly 8a including only the first and second tubular conductive fabrics 21 and 61 and the proton-exchange membrane 41. Later, the tubular assembly 8a can be cut and becomes a leading part of tubular-shaped MEA with leading part. This leading part may be used for binding in fuel cell assembly later.

The apparatus shown in FIG. 2 can be used to make leads shown in FIG. 5. In this case, the first and second catalyst-providing units 3 and 5 and the proton-exchange-membrane-providing unit 4 are stopped. That is, only the first and second weaving units 2 and 6 are activated to make a pair of the leading wire 8b including only the first and second tubular conductive fabrics 21 and 61. Later, the pair of leading wire 8b can be cut and become the leading wires of current collectors of both electrodes of the tubular-shaped MEA for fuel cell assembly.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An apparatus for making tubular-shaped membrane electrode assembly comprising:
   a guiding unit for guiding the direction of MEA production;
   a first weaving unit for weaving conductive fiber bundles into a first tubular conductive fabric around the guiding unit;
   a first catalyst-providing unit for forming a first catalyst film on the first tubular conductive fabric;
   a proton-exchange-membrane-providing unit for providing a proton-exchange-membrane on the first catalyst film;
   a second catalyst-providing unit for forming a second catalyst film on the proton-exchange-membrane;
   a second weaving unit for weaving conductive fiber bundles into a second tubular conductive fabric on the second catalyst film;
   a cooling and pulling unit for cooling and pulling the first tubular conductive fabric, the first catalyst film, the proton-exchange-membrane, the second catalyst film and the second tubular conductive fabric into a tubular laminate that can be cut into tubular-shaped membrane electrode assembly of appropriate lengths.

2. The apparatus according to claim 1, wherein the conductive fiber bundles are made of carbon.

3. The apparatus according to claim 1, wherein the first catalyst-providing unit provides electrode catalyst suitable for fuel cells on the first tubular conductive fabric.

4. The apparatus according to claim 1, wherein the proton-exchange-membrane-providing unit melts resin grains or powders and provides the molten resin onto the first catalyst layer.

5. The apparatus according to claim 4, wherein the resin is proton-exchanging resin.

6. The apparatus according to claim 4, wherein the resin is precursor of proton-exchanging resin.

7. The apparatus according to claim 5, wherein the second catalyst-providing unit provides electrode catalyst suitable for fuel cells onto the proton-exchanging resin.

8. The apparatus according to claim 1, wherein the thickness of proton-exchange membrane is in the range of one tenth to ten times the inside diameter of the tubular-shaped membrane electrode assembly.

9. The apparatus according to claim 1, wherein the thickness of the first and second catalyst films is one tenth of a micrometer to several millimeters.

* * * * *